United States Patent [19]

Kunkle et al.

[11] Patent Number: 4,680,104

[45] Date of Patent: Jul. 14, 1987

[54] APPARATUS FOR DEWATERING CLAY FILTER CAKE

[75] Inventors: Albert C. Kunkle, Macon; Edgar J. Maxwell, III, Thomson, both of Ga.

[73] Assignee: J. M. Huber Corporation, Borger, Tex.

[21] Appl. No.: 857,401

[22] Filed: Apr. 21, 1986

Related U.S. Application Data

[63] Continuation of Ser. No. 619,330, Jun. 11, 1984, abandoned.

[51] Int. Cl.⁴ .............................................. B01D 13/02
[52] U.S. Cl. ............................ 204/300 R; 204/182.2; 204/299 R; 204/301
[58] Field of Search ............ 204/182.2, 182.3, 299 R, 204/300 R, 301

[56] References Cited

U.S. PATENT DOCUMENTS

| | | | |
|---|---|---|---|
| 636,762 | 11/1899 | Conley | 210/400 |
| 2,873,028 | 2/1959 | Bried | 210/400 |
| 3,381,609 | 5/1968 | Malarkey, Jr. | 210/401 |
| 3,605,607 | 9/1971 | Gujer | 210/400 |
| 4,003,811 | 1/1977 | Kunkle | 204/299 R |
| 4,048,038 | 9/1977 | Kunkle | 204/300 R |
| 4,101,400 | 7/1978 | Pepping | 204/300 R |
| 4,110,189 | 8/1978 | Kunkle et al. | 204/300 R |
| 4,244,804 | 1/1981 | Moeglich | 204/300 R |
| 4,266,474 | 5/1981 | Bahr | 210/401 |
| 4,376,022 | 3/1983 | Porta et al. | 204/300 R X |

*Primary Examiner*—John F. Niebling
*Assistant Examiner*—Terryence Chapman
*Attorney, Agent, or Firm*—August E. Roehrig, Jr.

[57] ABSTRACT

An electrokinetic dewatering apparatus is disclosed which includes a pair of oppositely electrically charged continuously traveling webs or belts positioned to contact a quantity of clay material passed into a nip formed at the inlet to the dewatering apparatus. The clay cake is continuously contacted by the two webs while the cake passes therebetween. The clay material is not subjected to any pressure force substantially in excess of the contact pressure during the electrokinetic separation and removal of a portion of the water contained therein.

16 Claims, 8 Drawing Figures

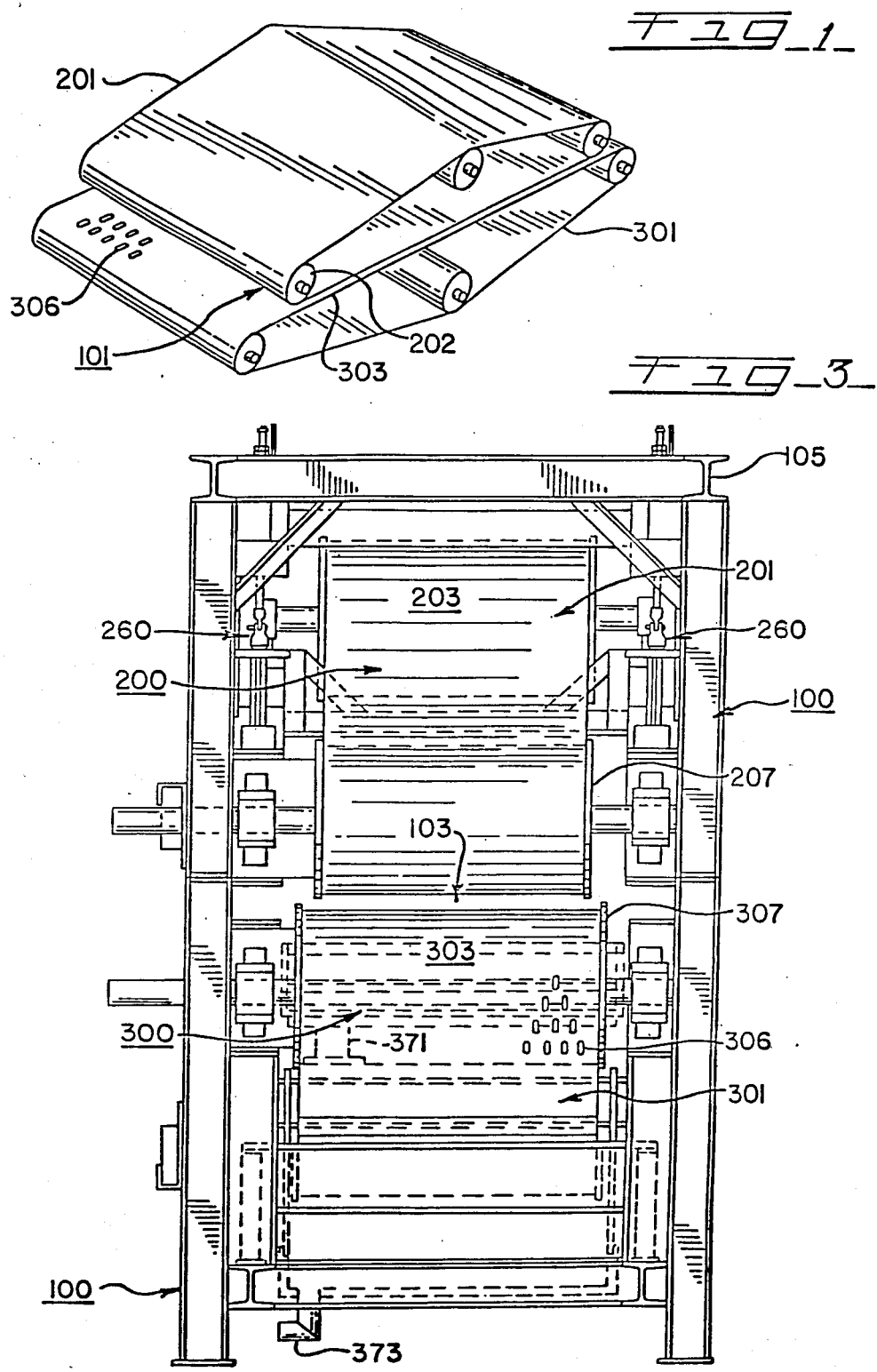

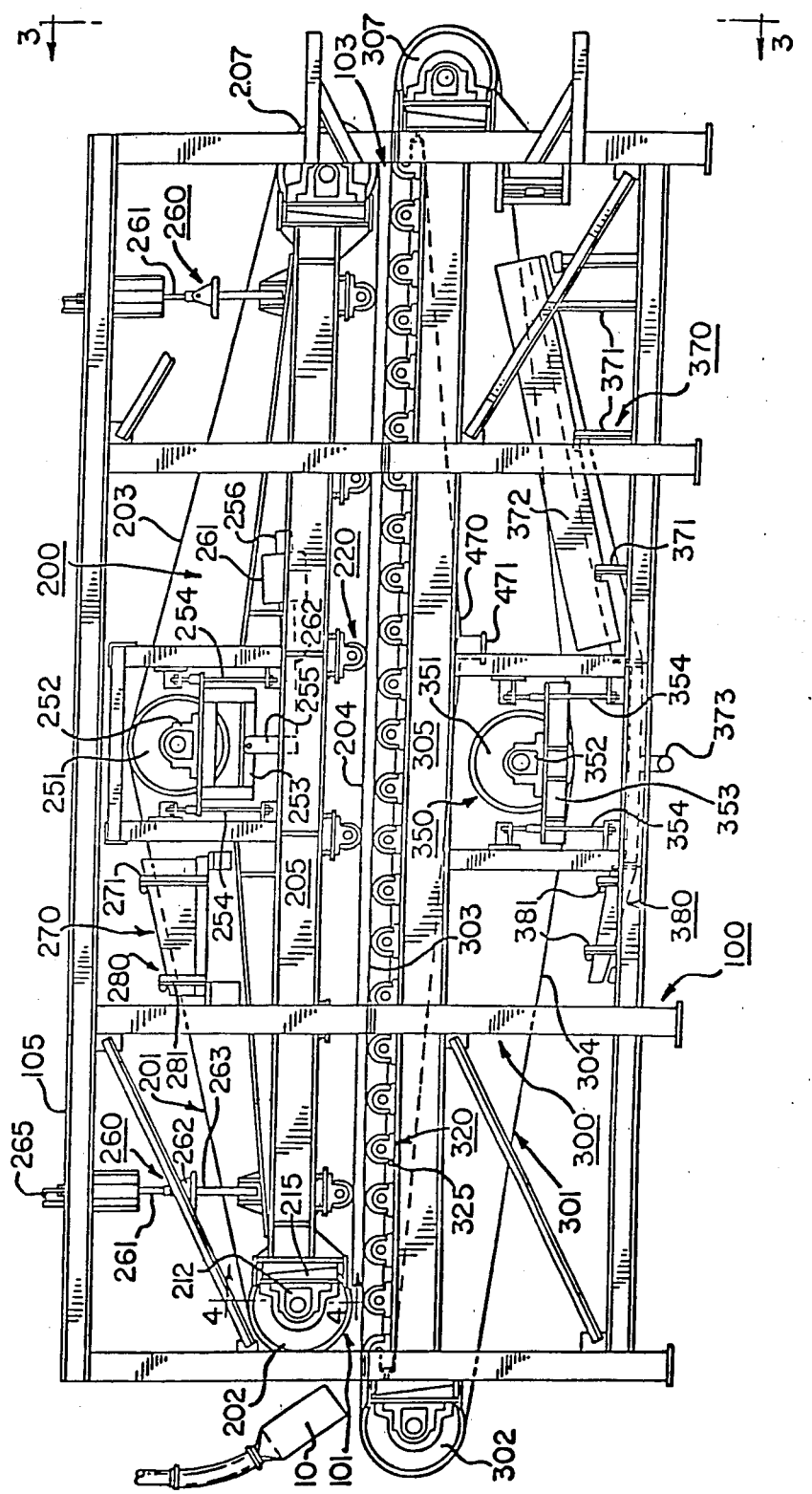

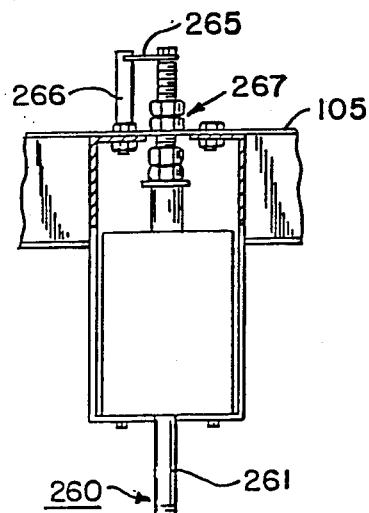
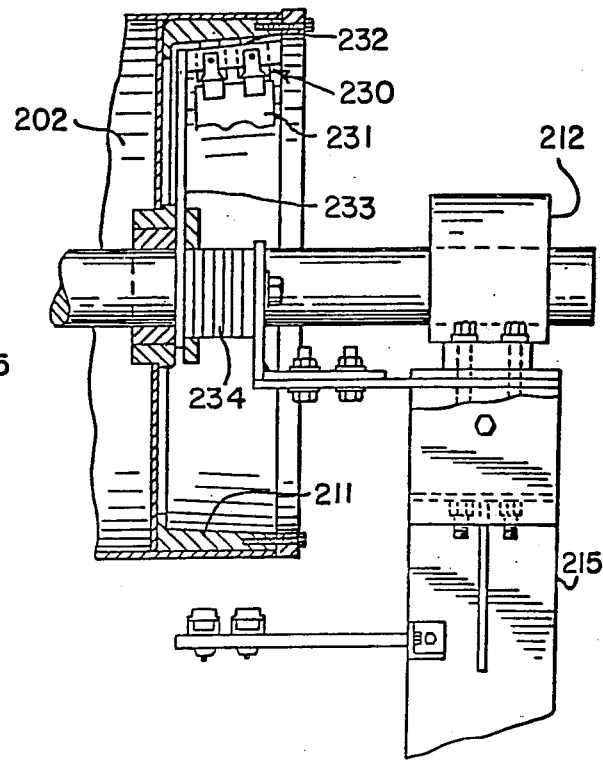
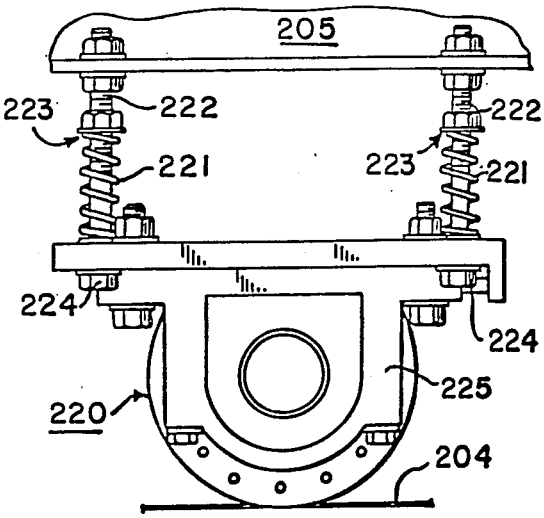

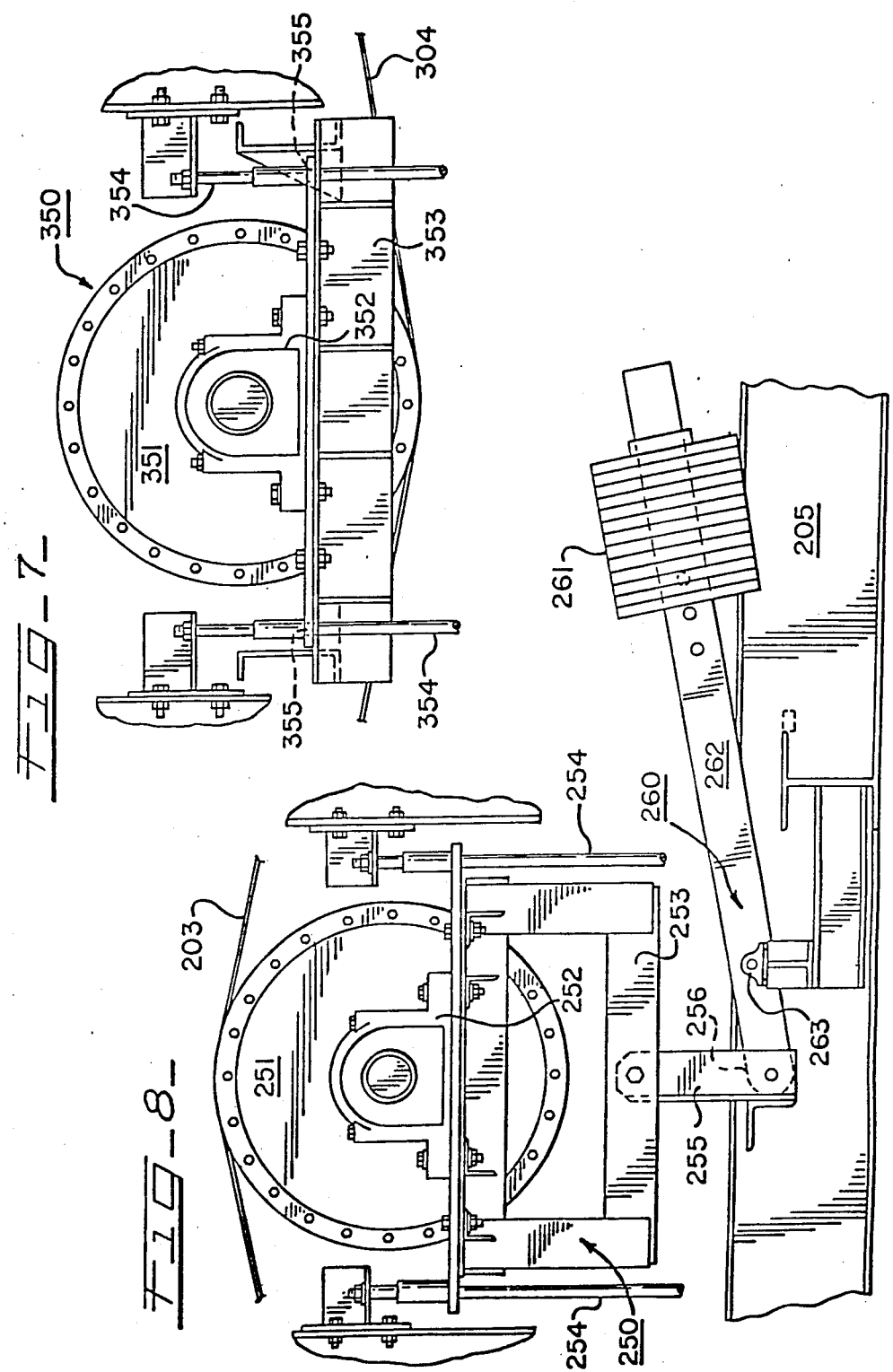

APPARATUS FOR DEWATERING CLAY FILTER CAKE

This is a continuation of application Ser. No. 619,330 filed June 11, 1984 now abandoned.

BACKGROUND OF THE INVENTION

This invention relates in general to an apparatus for removing water from clay and, in particular, to an apparatus for electrokinetically removing water from a clay cake as the clay cake passes through the apparatus along a predetermined path of movement.

More specifically, but without restriction to the particular use which is shown and described, this invention relates to a dewatering apparatus through which a clay cake is directed while exposed to an electrokinetic field, to remove a portion of the water from the clay cake and thereby increase the solids content of the cake.

Clays, such as kaolin, are widely used as adsorbents, pigments, catalysts, paper fillers and the like. Such clay generally occurs in geological deposits as a mixture with inert foreign materials from which it is desirable for certain commercial applications to separate the clay material before the clay is utilized. One method of separation of the clay from the inert foreign materials is effected by dispersing the crude clay and water with the aid of dispersing chemicals such as sodium silicate, sodium hexametaphosphate, sodium tripolyphosphate and tetrasodium pyrophosphate and such clay slurry is then blunged, degritted, classified and leached to effect removal of the undesired foreign materials. Following these steps, the clay is filtered to remove the dispersing and leaching chemicals, and a somewhat solid filter cake containing 50% to 60% clay solids is produced. This 50% to 60% clay solids cake is then redispersed and sprayed dried or otherwise dried in the flocculated state.

For various economic reasons, it is desirable in the clay industry to ship clay slurries containing at least substantially 70% solids. Therefore, it is conventional in the clay art to add approximately 30% to 50% spray dried clay to a 50% to 60% solids redispersed filter cake to yield a 70% solids slurry. The addition of spray dried clay to the redispersed clay filter cake to prepare a 70% solids slurry for shipment, adds significantly to the cost of the shipped slurry due to the relatively high costs of preparing spray dried clay. The art, therefore, has been continually seeking to effect methods whereby clay filter cakes containing at least substantially 70% clay solids can be directly obtained from clay suspensions without the addition of spray dried clay.

Among the methods which have been developed to obtain a more concentrated solids clay cake has been the use of electrokinetic phenomenon such as electrophoresis and electroosmosis. Such processes are disclosed, for example, in A. C. Kunkle, U.S. Pat. Nos. 4,003,811 and 4,048,038, and A. C. Kunkle, et al., U.S. Pat. No. 4,110,189, all of which have been assigned to the Assignee of the present invention. Apparatus for separating solid particles from an aqueous suspension utilizing electrophoresis and electroosmosis are disclosed in A. C. Kunkle, U.S. Pat. Nos. 3,980,457 and 4,132,626 and A. C. Kunkle, et al., U.S. Pat. No. 4,003,819, which have similarly been assigned. Additional general descriptions of the electrophoretic and electroosmotic phenomena are found in the references referred to in the specification of A. C. Kunkle, et al., U.S. Pat. No. 4,110,189.

Heretofore in the filtration of clay suspensions, a conventional practice has been to employ a rotary drum vacuum filter. Such filters are known to those skilled in the art and disclosed, for example, in any standard text such as the *Encyclopedia of Chemical Process Equipment;* Ed. Wm. J. Mead; Reinhold Publishing Co., N.Y., N.Y.; 1964, pp. 417–38; *Chemical Engineer's Handbook;* J. H. Perry, Ed.; McGraw-Hill Book Co., N.Y., N.Y.; 1963; pp. 19-73 to 19-86; W. L. McCabe and J. C. Smith, *Unit Operations of Chemical Engineering;* 2nd Ed.; McGraw-Hill Book Co., N.Y., N.Y.; 1967; pp. 880–904; A. S. Foust et al., *Principles of Unit Operations;* John Wiley & Sons, Inc., N.Y., N.Y., 1960; pp. 490–500.

Such rotary drum vacuum filters generally comprise a filter drum having a filter medium mounted on the external surface of the drum. The drum is rotatably mounted on a casing or housing with a vacuum being maintained within the drum interior. The drum rotates in a liquid in which solids material is suspended and, as the drum is rotated, the vacuum within the drum causes the liquid to pass through the filter medium on the external surface into the interior of the drum. A solid filter cake is thereby formed on the filter surface while the liquid filtrate is removed from the interior of the drum. Such filtration separates the liquid solids suspension into two parts: (1) a liquid filtrate which has passed through the filter medium on the exterior surface of the drum and which may contain a low concentration of solids material, dependent upon the material from which the filter medium is formed, and (2) a filter cake which is supported on the filter medium and which contains 30% or more, and generally 40-50%, of entrained suspension liquor.

SUMMARY OF THE INVENTION

In accordance with the present invention, there is provided an apparatus for electrokinetically treating a clay material having a solids content considerably less than 70% solids material. The clay material is directed along a predetermined path of movement while exposed to electrokinetic forces which remove the water from the clay material, while the material is transported through the field, to discharge a clay cake having a higher solids content than the material entering the apparatus and preferably at least substantially 70%.

It is, therefore, an object of this invention to improve the processing of clay to obtain refined clay filter cake having a solids content of at least substantially 70% solids.

Another object of this invention is to electrokinetically treat a flocculated clay material by electroosmotically removing water from the clay solids material.

A further object of this invention is to electroosmotically separate water from flocculated clay material, without subjecting the resultant filter cake to pressures sufficient to adversely effect the physical form of the filter cake from which the water is being removed.

These and other objects are attained in accordance with the present invention wherein there is provided an electrokinetic dewatering apparatus including a pair of oppositely electrically charged continuously traveling webs or belts positioned to contact a quantity of clay material passed into a nip formed at the inlet of the apparatus. The clay cake is continuously contacted by the two electrode belts or webs and passes therebetween without being subjected to a pressure force substantially in excess of the contact pressure, thereby preventing damage to the clay cake during the electrokinetic separation and removal of the water contained in the clay cake.

BRIEF DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a mechanical schematic of the apparatus to better illustrate the manner in which the apparatus functions to electroosmotically separate and remove water from a clay cake;

FIG. 2 is a frontal planar view of the invention;

FIG. 3 is an enlarged end profile view of the apparatus shown in FIG. 2 taken along lines 3—3;

FIG. 4 is an enlarged partial sectional view of the apparatus shown in FIG. 2 taken along lines 4—4 to better illustrate the manner in which the electrical field is established in the apparatus;

FIG. 5 is an enlarged view of a detailed portion of the apparatus shown in FIG. 2 to better illustrate the manner in which the relationship between the two opposing webs is maintained;

FIG. 6 is an enlarged view of a portion of the structure to better illustrate the manner in which spacing and contact is maintained; and FIGS. 7 and 8 are enlarged views of a tensioning mechanism by which the belts of the apparatus are maintained in a predetermined orientation.

DESCRIPTION OF THE PREFERRED EMBODIMENT

Referring now to FIG. 1, there is shown a mechanical schematic of the clay dewatering apparatus which is illustrated in detail in FIGS. 2-8. The dewatering apparatus includes two electrically conductive endless webs or belts 201 and 301 which are of opposing electrical polarities. The upper belt 201, sometimes referred to as the anode belt, is preferably coated with a material to inhibit corrosion which might result from contact between the anode belt and wet clay materials. The lower belt 301 forms a cathode, and is perforated or formed with apertures to permit the passage therethrough of water driven from the clay material by electrokinetic forces. The water removed from the clay material is drained through a suitable drain system (not shown in FIG. 1) for disposal or further treatment as desired.

As best shown in FIG. 2, a flocculated clay paste containing approximately 55% solids material is fed onto the lower or cathode belt 301 and passes through an entrance nip 101 formed between an upper entrance roller 202, associated with the anode belt 201, and the upper run 303 of the lower cathode belt 301, respectively. The clay paste material is thereafter passed between and in contact with the two oppositely charged electrode belts while subjected to an electrical field for effecting the removal of water from the clay paste as the material moves between and with the two endless electrode webs or belts 201 and 301.

The position of the two electrode belts 201 and 301 is maintained in a manner hereinafter to be described in detail, such that the upper belt 201 is in substantially pressure free and continuous contact with the clay material as it advances through the apparatus. This force, while sufficient to maintain contact with the clay material at all times, does not exert any external pressure substantially in excess of the contacting force, thereby preventing the clay material from being extruded through the perforations or apertures 306 formed in the lower or cathode web 301. As the clay paste advances through the apparatus, a constant voltage level is maintained between the two oppositely charged electrode webs 201 and 301. However, since the liquid is driven from the clay paste as it passes between the electrode belts, the electrical resistance of the clay material increases as the material moves along the path of movement so that the current across the cake so formed decreases as the liquid is removed.

The apparatus for removing the liquid from the clay material is shown in detail in FIGS. 2-8. The dewatering apparatus includes a frame structure 100 in which an upper and lower electrode belt assembly 200 and 300, respectively, are supported. As best shown in FIG. 2, a paste of clay material containing approximately 55% solids is fed onto the upper run or surface 303 of electrode belt 301 through a nozzle 10 from a source (not shown) and passes through the entrance nip 101 formed between the two electrode belts by the upper entrance roller 202 and the upper run or surface 303 of the lower electrode belt 301. The linear speed of both the upper and lower electrode belts 201 and 301 is the same, so that the clay paste advances therewith through the apparatus and emerges from the dewatering process as a high clay solids cake which passes over a lower exit roller 307 of the lower electrode belt 301 into a cake breaker, not shown.

The equal linear velocity for both the electrode belts 201 and 301 may be effected by using either a common or an independent synchronized drive source in a manner that is known to those skilled in the conveyor art, with any system being suitable as long as there is no relative motion between the two opposing surfaces of the electrode belts.

Referring now to the electrode belt assemblies, the lower electrode belt assembly 300 includes a horizontally extending frame 305, which is supported by the machine frame structure 100, and has at opposite ends thereof a lower entrance roller 302 and the lower exit roller 307 to define the horizontal run of the lower electrode belt 301. The lower surface of the upper run 303 of the lower electrode belt 301 is supported by a series of substantially identical support rollers 320 each of which are mounted on the horizontally extending frame member 305 by means of suitable bearing assemblies 325 which are connected to the frame member 305 to permit the rollers 320 to rotate relative thereto. The support rollers 320 function to provide a uniform support for the upper run 303 of the lower electrode belt 301 to maintain a substantially uniformly flat surface for supporting the clay materials carried thereon.

To assist in maintaining a substantially uniformly flat surface for supporting the clay materials carried on the upper run 303 of the lower electrode belt, a predetermined tension force is maintained on the electrode belt 301 by a tensioning roller mechanism 350 shown in FIG. 2, and in enlarged detail in FIG. 7. The tensioning roller assembly 350 is carried between the upper and lower runs 303 and 304, respectively, of the lower electrode belt 301 and floats vertically in contact with the inner surface of the lower belt run 304. Each end of tensioning roller 351 is rotatably journaled by a suitable bearing block 352 which is carried on a support frame 353 to permit vertical movement of the roller. The support frame 353 is constrained against horizontal movement by means of a pair of vertical guide rods 354 at each end of the frame structure 353. The support frame 353 is formed with a pair of openings 355 at each end through which the guide rods 354 are concentrically mounted to permit only vertical movement of the tensioning roller. In this manner while the tensioning roller 351 will freely float in a vertical direction to gravitationally maintain a predetermined tension in the lower electrode belt 301, the support frame 353 is constrained to vertical movement by the guide rods 354.

As the clay paste is fed onto the upper run 303 of the lower electrode belt 301, the clay materials advance through the apparatus and liquid is removed from the clay paste by electrokinetic forces established between the upper and lower electrode belts. As this liquid is removed from the clay materials, the clay paste that is fed into the apparatus becomes a clay cake which emerges from the outlet after a portion of the liquid has been electro-osmotically removed from the clay materials. As previously disclosed, the lower electrode belt 301 is formed with openings or apertures 306 through which the liquid, driven from the clay material by the electrokinetic action, will pass.

In order to collect the liquid driven from the clay materials for either further processing or disposal, an inclined trough 470 is supported from the lower electrode frame member 305 in a position extending beneath the support rollers 320 and the upper run 303 of the lower electrode belt. The trough 470 is positioned between the upper and lower runs 303 and 304, respectively, of the lower electrode 301 belt and is downwardly sloped to a discharge outlet 471 from which the liquid removed from the clay material may be discharged.

As previously disclosed, the electrical charge of the upper and lower electrode belts 201 and 301 is of opposite polarity. While the magnitude of charge may be varied, it has been found preferable to maintain the upper electrode belt 201 charged to a positive level and to maintain the lower electrode belt 301 at ground potential. In this manner, maintaining the lower electrode belt assembly at ground potential facilitates fabrication of the dewatering appartus by eliminating the necessity of electrically insulating mechanical support connections between the lower electrode belt assembly 300 and the machine frame 100.

An electrical charge is imposed on either of the electrode belts 201 or 301 in a similar manner which is illustrated in detail in FIG. 4 using the upper entrance roller 202 for a typical illustration. While FIG. 4 is an enlarged view of a portion of the upper entrance roller 202, it is to be understood that the manner in which an electrical charge is applied to the upper electrode belt 201 through the upper entrance roller 202 is shown for convenience of illustration, and similar structure can be utilized to electrically charge both upper and lower electrode belts 201 and 301, respectively, through both the entrance and the exit roller associated with each of the two upper and lower electrode belt assemblies. In certain applications only one of the rollers associated with each of the upper and lower electrode belt assemblies 201 and 301, respectively, may be necessary to maintain a suitable electrical charge on the electrode belts. However, depending upon the nature of the belts and their fabrication, electrical discontinuities may be formed in the belt which would require multiple sources of electrical charging energy on each belt as through both the entrance and exit rollers associated with each belt.

Referring again to FIG. 4, the roller 202 is formed of an electrically conductive material with at least one end thereof having a recessed end cap 211. Each end of the roller 202 is journaled for rotation in a suitable bearing block 212 which is supported from the ends of a horizontally extending frame member 215 carried between the upper and lower runs 203 and 204, respectively, of the upper electrode belt 201. The roller 202 and the entire upper electrode assembly 200 are electrically isolated from the machine frame 100 through suitable insulators which permit the upper roller assembly 200 to be supported by, but electrically isolated from, the machine frame structure 100. An electrical charge is imposed on the electrode belt 201 through the recessed roller end cap 211 by means of a brush or wiper contact assembly 230. An electrical conductor or cable 231 providing a source of electrical energy, is connected to a plurality of brushes or wiper contacts 232 which are carried on one end of a bracket 233 fixed at its other end to an electrical insulator 234 which electrically isolates the bracket and brushes from the machine frame 100. The brushes 232 are carried in a position within the roller end cap 211, and in contact therewith, so that the desired electrical charge level and polarity will be imposed on the roller 202 thereby charging the electrode belt 201 to the desired voltage level and polarity.

As with the lower electrode belt 301, a predetermined tension force is imposed on the upper electrode belt 201 to maintain a substantially uniform contact surface between the lower surface of the lower run 204 of the upper electrode belt 201 and the clay material in contact therewith. The tensioning roller assembly 250, shown in detail in FIG. 8, imposes the tension force on the upper electrode belt 201 and is constructed in a similar manner as the lower tensioning roller assembly 350 associated with the lower electrode belt 301. However, the support frame 253, which carries the bearing blocks 252 in which the tensioning roller 251 is rotatably journaled, and the vertical guide rods 254, are carried by the horizontally extending frame member 205 which defines the length of the run of the upper electrode assembly 200.

In order for the tensioning roller 251 to exert a predetermined upward force for maintaining the desired tension forces in the upper electrode belt 201, the support frame 253 is connected to one end of a vertically disposed lever arms 255 which has at the other end of the lever arm connected to the "free" end 256 of the lever arm of a weighted lever and fulcrum assembly 260. The lever and fulcrum assembly 260 is carried by the horizontally extending frame member 205 with a plurality of weights 261 carried at one end of a lever arm 262. In this manner the lever arm 262 is biased about a fulcrum 263 in a clockwise direction, as shown in FIGS. 2 and 8, thereby imposing an upward force on the end 256 conected to the lever arm 255. By adjusting the magnitude and position of the weights 261, the upward vertical force imposed on the support frame 253 can be varied.

To assist in maintaining a uniform contact surface of the lower run 204 of the upper electrode belt 201 against the clay material, a downward force is imposed on the upper surface of the lower run by means of a plurality of spring loaded idler rollers 220. These rollers 220, one of which is shown in detail in FIG. 6, are supported from the bottom of the horizontally extending frame member 205 to impose a downward force on the lower run of the electrode belt 201. The magnitude of this force is determined by a pair of springs 221, supporting each end of each roller 220. Preferably the force imposed should be sufficient to maintain contact between the lower run 204 of the upper electrode belt and the clay material, but not so great as to extrude the clay material through the perforations or apertures 306 forced in the lower electrode belt 301 through which pass the liquid removed from the clay material.

As best shown in FIG. 6, the enlarged view of one of the rollers 220, each roller is rotatably journaled at its ends in a suitable bearing block assembly 225. The bearing block assemblies are each suspended from the lower portion of the horizontally extending frame member 205 by means of a pair of threaded rods 222, which pass through apertures formed in the bearing block assemblies and are secured to the horizontally extending frame member 205. In this manner the bearing block assemblies 225 are movable in a vertical direction relative to the suspending rods 222, and are biased out from the bottom of the horizontally extending frame member 205 into contact with the lower run 204 of the upper electrode belt 201. The compression springs 221, which encircle the rods 222, impose a downward force which may be varied by means of an adjusting nut assembly 223. One end of each rod 222 is secured to the lower portion of the horizontally extending frame member 205, and the other end of the rod is formed with a stop 224 to limit the downward vertical movement of the rollers 220.

While the spacing between the lower run 204 of the upper electrode belt 201 and the upper run 303 of the lower electrode belt 301 appears in FIG. 2 to be maintained constant, as the clay paste progresses through the apparatus and liquid is driven therefrom by the electrokinetic action, the thickness of the material decreases as the material passes from the entrance nip 101 to the exit nip 103. Therefore, it is necessary that the spacing between the two electrode belts converge accordingly from the entrance nip 101, whereat the clay paste is fed onto the lower electrode belt from the nozzle 10, through the exit nip 103 defined between the upper exit roller 207 and the upper surface 303 of the lower electrode belt 301.

In order to provide the required convergence between the two electrode belts 201 and 301, while preventing excessive compression forces which might result in the clay material being extruded into or through the perforations 306 in the lower electrode belt 301, the upper electrode assembly 200 is suspended from the machine frame 205 by a suspension system 260 including vertically suspended rods 261 which permit the upper electrode belt 201 to be positioned in a manner which converges from the entrance nip 101 towards the exit nip 103 in controlled increments. This suspension system 260, shown enlarged in FIG. 5, comprises the vertically extending threaded rods 261 which pass through an aperture formed in the uppermost member 105 of the machine frame 100, and extend downward with the lowermost end connected to an electrically insulating coupling 262, to enable the suspension system 260 to hold the upper electrode assembly 200 in a predetermined position without transmitting the electrical charge imposed on the electrode assembly to the machine frame 100. Suspended from the bottom portion of the insulator coupling 262 is a link member 263 which is connected at its opposite end to a bracket 264 suitably secured to the upper portion of the horizontally extending frame member 205. The upper end of the threaded rods 261 have connected thereto a pointer 265 which in combination with a reference marker 266, secured to the frame member 105, provides a spacial reference point by which the vertical position of the threaded rod 261 may be vertically adjusted to control the spacing between the lower run 204 of the upper electrode belt 201 and the upper run 303 of the lower electrode belt 301 in accordance with the change in thickness of the clay material to maintain constant contact therewith. As the clay material passes through the apparatus, the convergent spacing between the upper and lower electrode belts can be fixed by means of the lock nut assembly 267 on each of the threaded rods 261, to maintain contact with the clay material at all times while passing through the apparatus.

After the cake passes from the apparatus over the lower exit roller 307, the clay material will have a sufficient amount of liquid removed therefrom to form a clay cake of at least substantially 70% solids material. This clay cake will pass over the lower exit roller 307 into a cake breaker (not shown) and the electrode belts will continue to rotate continuously processing additional material as it is introduced as a paste through the nozzle 10. After the clay cake is discharged, the belts 201 and 301 pass through cleaning stations whereat the surface of the belt which contacts the clay material is washed by spraying the surface with water, and then dried by subjecting the belts to the discharge from an air dryer.

Referring now to the lower electrode assembly 300, after the lower electrode belt 301 passes over the lower exit roller 307 thereby discharging the filter cake into the cake breaker, the belt 301 continues to rotate through a multiple station belt washer assembly 370 (shown in FIG. 2) whereat spray heads 371 direct a spray of water upwards against the belt surface prior to its passing beneath the tensioning roller 351 with the water draining from the belt into a sloped drain pan 372 and out through a drain outlet 373. The belt 301 is then subjected to a multiple stage air dryer 380 whereat air jets 381 discharge air against the belt surface to remove the wash water and substantially dry the belt surface.

Similarly, the upper electrode belt 201 upon passing over the upper exit roller 207 and the upper tensioning roller 251 passes beneath a belt wash station 270 whereat water jets 271 spray recirculated water onto the outer belt surface. The belt 201 is then subjected to an air dryer 280 wherein a discharge of air from air jets 281 which removes any residual wash water and dries the belt sufficiently for further processing.

Having described the structure of the apparatus in operation, a preferred embodiment incorporates an upper electrode belt 201 of titanium or tantalum substrate with a mixed metal oxide coating including a platinum group metal oxide of the type referred to as a Dimensionally Stable Anode available from Diamond Shamrock Company of Chardon, Ohio. The bottom electrode belt 301 is preferably made of perforated stainless steel with an open area sufficient to pass the electroosmotically removed filtrate and preferably having at least 25% open space. The lower electrode assembly 300 is preferably electrically grounded, for convenience of construction, and the upper electrode assembly 200 is isolated from the machine frame 100, and charged with an electrical voltage sufficient to induce electroosmotic dewatering. In use, a voltage of approximately 4 mv to approximately 20 mv per square inch of effective anode area, or establishing a current density of about 0.05 amps to about 0.25 amps per square inch has been found to be satisfactory.

The speed at which the belts 201, 301 move in conveying the clay materials through the apparatus is dependent upon the length of the parallel run therebetween. A satisfactory belt speed should be such that the clay materials will be retained in the electric field between the belts at least about 1 minute to about 8 minutes or less, as long as such time is effective to remove a sufficient amount of water in order to obtain the desired approximately 70% solids content.

The convergence of belt 201 toward belt 301 is such that the belts will always remain in contact with the clay material while the thickness of this material is decreasing as water is removed therefrom. Suitable ranges of convergence have been found in spacing the opening at the entrance nip 101 from between about ½ inch to about 3 inches. Accordingly, the exit nip 103 has been spaced between approximately ¼ inch and less than about 3 inches.

Similarly, the rate at which the clay paste is introduced into the dewatering apparatus must be sufficient to fill the space between the two electrode belts 201, 301 and maintain contact with the upper belt 201. The actual flow rate at which paste is introduced into the entrance nip 101 will, therefore, vary to accomplish this objective.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawings and described in the specificiation as the best mode presently contemplated for carrying out this invention, but that the invention will include any embodiments falling with the scope of the appended claims.

What is claimed is:

1. An apparatus for dewatering a liquid containing clay material to form a clay cake of at least approximately 70% solids content comprising,
   at least two electrically conductive conveying mechanisms, each having an outer clay material contacting surface and an inner supported surface, positioned adjacent to but spaced from each other,
   means for moving said electrically conductive conveying mechanisms in an endless path of movement in the same direction and at the same linear speed,
   means for introducing liquid containing clay material into the space between and into direct contact with said opposed electrically conductive conveying mechanism for movement therewith and therebetween along at least a portion of said endless path of movement,
   means for establishing an electric field between said electrically conductive conveying mechanisms of a magnitude sufficient to electrokinetically drive at least a portion of the liquid from the clay material passing therewith and therebetween, and
   means for maintaining continuous contact between said clay material and said electrically conductive conveying mechanisms without subjecting said clay material to a pressure force substantially in excess of the contact pressure while moving therewith and therebetween along at least a portion of said endless path of movement to permit the electrokinetic forces to drive a sufficient amount of liquid from the clay material to form a clay cake having at least approximately 70% solids material.

2. The apparatus as set forth in claim 1 wherein said electrically conductive conveying mechanisms comprise two conveyor belts positioned such that at least a portion of their respective paths of movement converge towards each other to facilitate maintaining continuous contact between the conveyor belts and clay material moving therewith and therebetween.

3. The apparatus of claim 2 wherein positioning of said electrically conductive conveying mechanisms to effect convergence of a portion of their endless paths of movement includes support means for electrically isolating one of said electrically conductive conveying mechanism from the other,
   said suspension means including indicia means for determining the spacial relationship between said electrically conductive conveying mechanisms.

4. The apparatus of claim 2 wherein said conveyor belts are positioned between approximately ½ inches and approximately 3 inches at an entrance nip thereto and between approximately ¼ inches and approximately no greater than 3 inches at an exit nip therebetween, sufficient to maintain continual contact between the belts and the clay material passing therebetween as water is removed therefrom.

5. The apparatus of claim 1 wherein said means for maintaining continuous contact between said clay material and said electrically conductive conveying mechanisms includes a plurality of support rollers positioned in contact with said support surface, said support rollers being rotatably journaled for movement with said supported surface for supporting said outer clay material contacting surface in a predetermined position.

6. The apparatus of claim 5 wherein said support rollers are spring biased into contact with said supported surface.

7. The apparatus of claim 1 wherein said means for maintaining continuous contact between said clay material and said electrically conductive conveying mechanisms includes a tensioning roller positioned in contact with said support surface and rotatably journaled for movement therewith,
   said tensioning roller being constrained for vertical movement relative to said supported surface and gravitationally imposing a downward force thereon to maintain said outer clay material contacting surface in a predetermined position.

8. The apparatus of claim 1 wherein said means for maintaining continuous contact between said clay material and said electrically conductive conveying mechanisms includes a tensioning roller positioned in contact with said supported surface and rotatably journaled for movement therewith,
   said tensioning roller being constrained for vertical movement relative to said supported surface and carried by lever means for imposing an upward vertical force against said supported surface for maintaining said outer clay material contacting surface in a predetermined position.

9. The apparatus of claim 8 wherein said lever means for imposing an upward vertical force on said tensioning roller comprises a lever and fulcrum assembly including a lever arm pivotally supported between its two ends, one end of said lever arm being operatively connected to the tensioning roller and the other end of said lever arm carrying a weight which may be positioned therealong to vary the upward vertical force imposed against said tensioning roller.

10. The apparatus of claim 1 wherein said means for establishing an electric field between said electrically conductive conveying mechanisms comprises a wiper contact positioned to engage a portion of said electrically conductive conveying mechanisms to establish a uniform electric charge thereupon.

11. The apparatus of claim 10 wherein said electrically conductive conveying mechanisms comprise two conveyor belts each carried by a pair of conveyor rollers which define the run length thereof, and said electrical wiper contacts are positioned within a portion of at least one of said conveyor rollers for imposing an electrical charge on said conveyor belts therethrough.

12. The apparatus of claim 1 wherein said two electrically conductive conveying mechanisms are spaced apart no greater than approximately 3 inches and no less than approximately ½ inches.

13. The apparatus of claim 1 wherein said electrically conductive conveying mechanisms move in an endless path of movement in the same direction and at the same linear speed to effect a retention time in the electrical field of from about 1 minute to about 8 minutes or less, effective to remove an amount of water therefrom sufficient to form an approximately 70% solids content clay cake.

14. The apparatus of claim 1 wherein said means for introducing liquid containing clay material into the space between said opposed electrically conductive conveying mechanisms introduces the liquid containing clay material at a rate sufficient to fill the space between the said two electrically conductive conveying mechanisms, and to maintain contact therebetween.

15. The apparatus of claim 1 wherein said means for establishing an electric field between said electrically conductive conveying mechanisms establishes an electric field therebetween of a magnitude between about 4 and about 20 mv/in$^2$ of effective anode area.

16. The apparatus of claim 1 wherein said means for establishing an electric field between said electrically conductive conveying mechanisms establishes an electric field therebetween of a magnitude sufficient to produce a current density of about 0.05 to about 0.25 amps/in$^2$ of anode area.

* * * * *